United States Patent
Daneau et al.

(10) Patent No.: US 7,278,260 B2
(45) Date of Patent: Oct. 9, 2007

(54) METHOD FOR CONTROLLING AN INTERNAL COMBUSTION ENGINE FOR REGENERATING EXHAUST GAS PURIFYING MEANS AND DEVICE THEREFOR

(75) Inventors: Marc Daneau, Boulogne Billancourt (FR); Bernard Dionnet, Morigny-Champigny (FR); Stephane Cochet, Versailles (FR); Philippe Aucouturier, Ermont (FR); Jean-Claude Mollet, Garches (FR)

(73) Assignee: Renault s.a.s., Boulogne Billancourt (FR)

( * ) Notice: Subject to any disclaimer, the term of this patent is extended or adjusted under 35 U.S.C. 154(b) by 0 days.

(21) Appl. No.: 10/539,612

(22) PCT Filed: Dec. 12, 2003

(86) PCT No.: PCT/FR03/03693

§ 371 (c)(1),
(2), (4) Date: Mar. 30, 2006

(87) PCT Pub. No.: WO2004/065766

PCT Pub. Date: Aug. 5, 2004

(65) Prior Publication Data

US 2006/0185349 A1 Aug. 24, 2006

(30) Foreign Application Priority Data

Dec. 18, 2002 (FR) .................................. 02 16127

(51) Int. Cl.
*F01N 3/00* (2006.01)

(52) U.S. Cl. ............................. 60/285; 60/274; 60/276; 60/297; 60/301

(58) Field of Classification Search .................. 60/274, 60/276, 277, 285, 295, 297, 301
See application file for complete search history.

(56) References Cited

U.S. PATENT DOCUMENTS

| | | | | |
|---|---|---|---|---|
| 5,172,320 | A * | 12/1992 | Nada | 701/103 |
| 5,313,791 | A | 5/1994 | Hamburg et al. | |
| 5,483,795 | A * | 1/1996 | Katoh et al. | 60/276 |
| 6,167,695 | B1 * | 1/2001 | Itou et al. | 60/274 |
| 6,314,723 | B1 * | 11/2001 | Ketterer et al. | 60/277 |
| 6,347,513 | B2 * | 2/2002 | Pfleger et al. | 60/277 |
| 6,408,615 | B1 * | 6/2002 | Hahn | 60/274 |
| 6,871,492 | B2 * | 3/2005 | Huynh et al. | 60/295 |
| 7,000,385 | B2 * | 2/2006 | Miyashita | 60/295 |

FOREIGN PATENT DOCUMENTS

EP 0 636 770 2/1995

* cited by examiner

*Primary Examiner*—Binh Q. Tran
(74) *Attorney, Agent, or Firm*—Oblon, Spivak, McClelland, Maier & Neustadt, P.C.

(57) ABSTRACT

A method for controlling an internal combustion engine for regenerating an exhaust gas purifying mechanism arranged on an exhaust line of the engine during a phase of regeneration of the purifying mechanism. The method analyzes an exhaust gas composition solely downstream of the purifying mechanism and develops, based on the analysis, a control signal for the engine to modify an exhaust gas composition upstream of the purifying mechanism.

16 Claims, 3 Drawing Sheets

FIG.1

METHOD FOR CONTROLLING AN INTERNAL COMBUSTION ENGINE FOR REGENERATING EXHAUST GAS PURIFYING MEANS AND DEVICE THEREFOR

The present invention relates to a method for control of an internal combustion engine, especially in order to regenerate purifying means associated with the engine, and to an associated control device.

Efforts are made to reduce the polluting emissions of motor vehicles equipped with internal combustion engines, especially the emissions of carbon monoxide (CO), nitrogen oxides (NOx) and unburned hydrocarbons (HC).

This is accomplished by disposing, in a manner known in itself, exhaust-gas purifying elements such as catalytic converters, of the nitrogen oxides trap type, capable of favoring oxidation or reduction of these polluting emissions in order to transform them into emissions considered to be non-polluting.

In the catalytic converters, the nitrogen oxides are retained on active sites of catalytic elements that favor their reaction with reducing agents present in the exhaust gases. Phases of purging of the catalytic elements are provided, in which the composition of the exhaust gases is modified in order to favor elimination of the nitrogen oxides trapped on the catalytic sites of the catalytic elements.

During a purge phase, the composition of the exhaust gases can be determined by measurements using a proportional oxygen sensor situated on an exhaust-gas line upstream from the purifying means, in order to know the composition of the exhaust gases entering the purifying means and thus to be able to exert better control over elimination of the trapped nitrogen oxides. The proportional oxygen sensor makes it possible more particularly to know the fuel/air richness of the exhaust gases.

On the basis of the signal delivered by the sensor, it will be possible, for example, by means of a feedback loop, to act on the injectors in order to modify the combustion mixture and the composition of the exhaust gases emerging from the engine.

It may be desirable to provide, for control of an internal combustion engine, a method having improved reliability and a reduced operating cost.

The present invention relates to a method for control of an internal combustion engine, which can be applied on the basis of an engine of simple design, having a limited number of elements, which makes it possible to reduce the cost of manufacture of the engine and to improve the reliability of the engine.

The present invention also relates to a method for control of an engine, permitting the use of elements that are more robust and better adapted to the engine environment.

In such a method for control of an internal combustion engine in order to regenerate exhaust-gas purifying means disposed on an exhaust line of the engine, the composition of the exhaust gases is analyzed only downstream from the purifying means during a phase of regeneration of the purifying means, and an engine control signal is created on the basis of the said analysis in order to modify the composition of the exhaust gases upstream from the purifying means.

The analysis of the exhaust gases downstream from the purifying means makes it possible more accurately to detect the end of a phase of purging, for example of a nitrogen oxides trap, by a change of the composition of the exhaust gases downstream from the purifying means. The engine control based on a downstream analysis of the purifying means makes it possible to avoid the use of supplementary analysis means upstream from the purifying means, which supplementary would be additionally exposed to the high temperature and pressure of the exhaust gases directly at the engine outlet.

In one embodiment, the composition of the exhaust gases is modified by modifying the composition of the combustion mixture.

In one embodiment, the composition of the exhaust gases is analyzed by means of an oxygen sensor of the all-or-nothing type or of the proportional type situated downstream from the purifying means. It has been observed that the signal delivered by an oxygen sensor of the all-or-nothing type, or in other words of the "lambda" type, or of the proportional type, disposed downstream from the purifying means, is substantially proportional to the fuel/air richness of the exhaust gases upstream from the purifying means during a purge phase, and might be advantageously used for regulation of the composition of the exhaust gases.

The signal delivered by a lambda sensor depends on the operating temperature of the lambda sensor. Advantageously, provisions can be made to control the operating temperature of the sensor.

To create an engine control signal, the output signal of the sensor can be compared with a reference value and a control signal can be created that reduces the difference between the output signal of the sensor and the reference value. The control signal is a control signal that makes it possible to influence the composition of the exhaust gases in controlled manner.

In one embodiment, the end stage of a regeneration phase is detected on the basis of a control signal for modification of the composition of the exhaust gases. It has been observed that an end stage of purging might be detected on the basis of a signal delivered by a lambda sensor disposed downstream from the purifying means. In the case of regulation of the composition of the exhaust gases situated downstream on the basis of the output signal of a sensor downstream from the purifying means, the said output signal is regulated and may prove difficult to use in order to detect the end of a purge stage. Nevertheless, the control signal created on the basis of the measured signal can be used to detect the end of a purge phase.

The invention also relates to a control device for regeneration of exhaust-gas purifying means disposed on an exhaust line of an internal combustion engine, comprising a control module capable of modifying the fuel injection and an oxygen sensor disposed on the exhaust line directly downstream from the purifying means. During a phase of regeneration of the purifying means, the control module is capable of causing a modification of the composition of the exhaust gases solely as a function of an output signal of the said oxygen sensor.

Advantageously, the oxygen sensor is of the all-or-nothing or "lambda" type or of the proportional type.

The device may additionally comprise means for controlling the operating temperature of the sensor.

Preferably the device comprises a detection module capable of detecting the end of a regeneration phase as a function of a control signal produced by the control module.

The present invention and its advantages will be better understood from a study of the detailed description of an embodiment chosen by way of example and in no way limitative, illustrated by the attached drawings, wherein.

Figure 1:
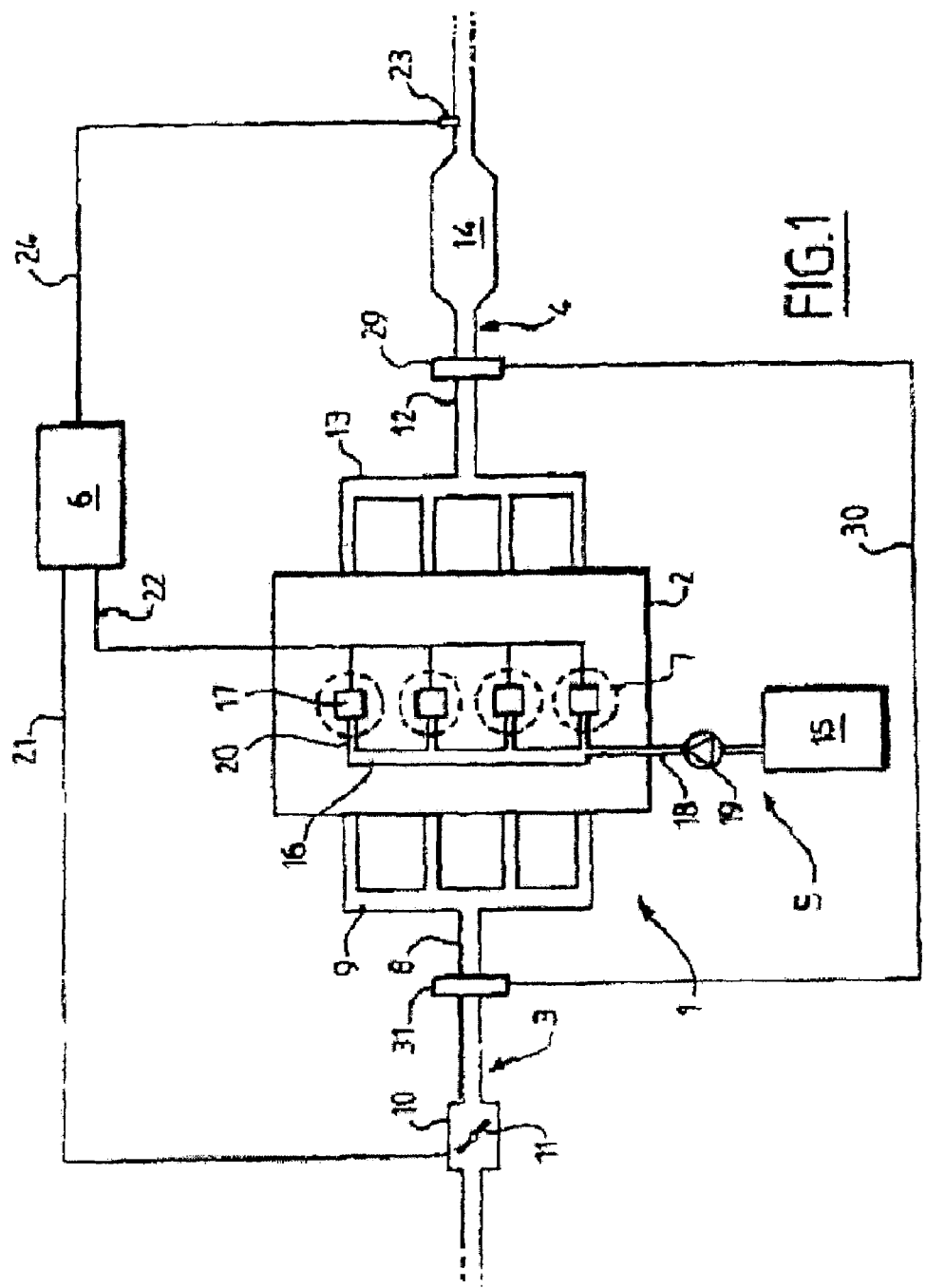
FIG. 1 is a schematic overall view of a drive assembly for a motor vehicle equipped with exhaust-gas purifying means.

In FIG. 1, a drive assembly denoted on the whole by 1 comprises an internal combustion engine 2, an air-intake line 3, an exhaust line 4, a fuel-supply device 5 and a control unit 6.

Internal combustion engine 2 comprises combustion chambers or cylinders 7, in this case four, represented by dotted circles.

Supply line 3 comprises an intermediate supply conduit 8 discharging at one end into an intake manifold 9 having one inlet and four outlets to distribute an intake-air flow in combustion chambers 7, and equipped on the opposite side with an intake-air flow-control element 10 in the form of an intake butterfly valve 11 disposed between intermediate conduit 8 and an air intake, not illustrated in the drawing.

Exhaust line 4 comprises an intermediate exhaust conduit 12, one inlet of which is connected to an exhaust manifold 13 with four inlets and one outlet, to collect and channel an exhaust-gas flow emerging from cylinders 7 of engine 2, an outlet of intermediate exhaust conduit 12 being connected to an exhaust-gas purifying means in the form of a catalytic converter 14, which can be, for example, of the nitrogen oxides trap type, and which is disposed upstream from a terminal outlet of exhaust line 4, not illustrated in the figure.

Fuel supply device 5 comprises a fuel tank 15, a common rail 16 and injectors 17, in this case four, provided for injection of fuel directly into cylinders 7 of engine 2. Common rail 16 is connected to tank 15 via a supply conduit 18, and by a supply system 19 connecting supply conduit 18 to tank 15. As an example that is in no way limitative, the supply system can comprise a high-pressure supply pump, itself supplied from the tank by a low-pressure pump or "supercharger" pump. Injectors 17 are connected to common rail 16 via injection conduits 20. Supply system 19 is controlled so that it fills common rail 16 with fuel and maintains a setpoint pressure in common rail 16, serving as pressure reserve for the supply of each of injectors 17.

Control unit 6 is designed to create control signals for butterfly valve 11 and injectors 17. Control unit 6 can also be designed to control other elements (not illustrated) for execution of elementary functions of the engine (exhaust-gas recirculation valve, etc.).

Control unit 6 is connected via control links 21, 22 respectively to an actuator (not illustrated) that controls the position of butterfly valve 11, and to injectors 17.

Drive assembly 1 comprises a turbo device for accelerating the intake air. The turbo device comprises a turbine 29 disposed on intermediate exhaust conduit 12 downstream from exhaust manifold 13, turbine 29 driving, by means of a turbo shaft 30, represented schematically by a line, a compressor 31 disposed on intermediate intake conduit 8, upstream from intake manifold 9.

Control unit 6 uses, for creation of control signals, measured signals originating from an oxygen sensor 23 of the lambda or proportional type situated on exhaust line 4 directly downstream from catalytic converter 14. Control unit 6 is connected to sensor 23 via a measuring link 24.

During operation, control unit 6 creates, on the basis of any signal necessary or useful for controlling the internal combustion engine, such as the position signal of an accelerator pedal, the speed of rotation of the engine or the load applied to the engine, or a coolant fluid temperature, etc., signals for control of butterfly valve 11 and injectors 17 as well as other elements for execution of elementary functions associated with the engine. During a phase of purging of catalytic converter 14, control unit 6 adapts the control of injectors 17 to take into account a measured signal originating from lambda sensor 23, as will be described in more detail hereinafter.

Of course, the invention is not limited to the case in which injectors 17 are influenced in order to modify the composition of the exhaust gases. Provisions could also be made to control any element for execution of elementary functions of the engine making possible to influence the composition of the exhaust gases.

Figure 4:
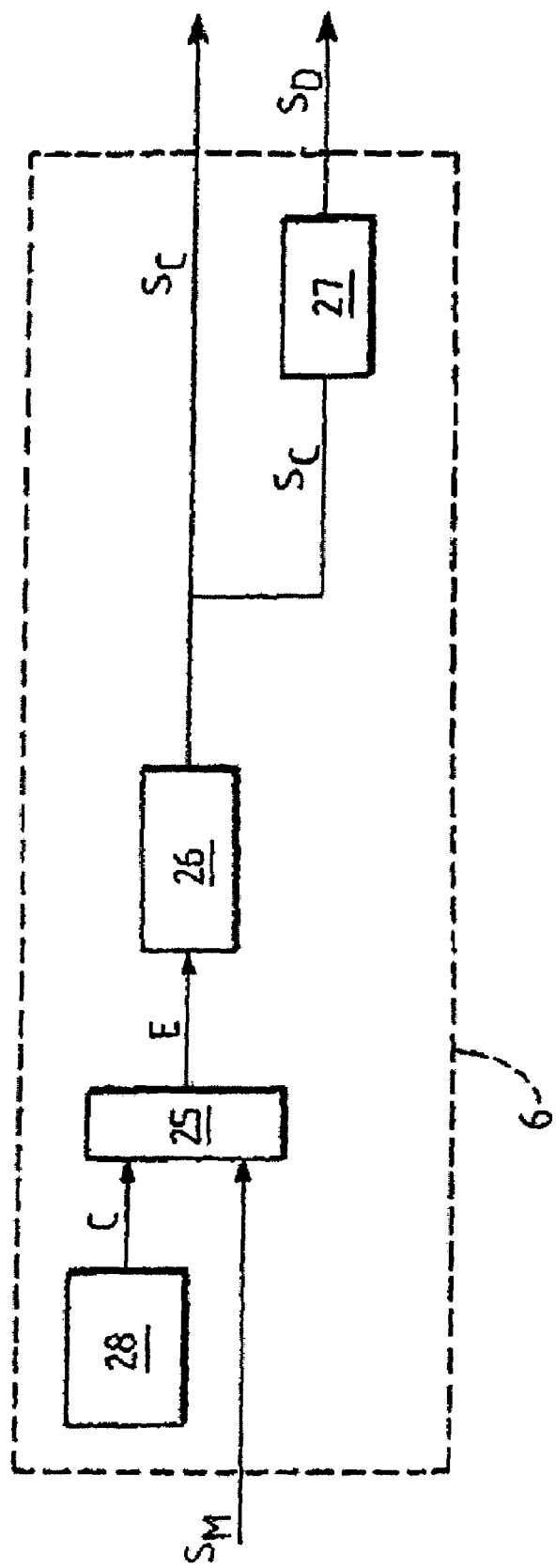
FIG. 4 is a block diagram representing a control module according to one aspect of the invention.

In FIG. 4, described by retaining the references for elements similar to those of FIG. 1, control unit 6 comprises a comparator 25 with two inputs and one output, the said comparator 25 receiving at the input not only a reference or setpoint value C originating from a reference module 28 but also the output signal $S_M$ of sensor 23. At its output, comparator 25 delivers the difference E, defined as the difference between reference value C and output signal $S_M$. The difference E is sent to the input of a control module 26 capable of creating a control signal $S_C$.

Control signal $S_C$ is transmitted either directly to an element for execution of an elementary function of the engine, such as injectors 17, or via different control means. In this second case, control signal $S_C$ can be a signal for correction of a primary control signal created elsewhere by a primary control module (not illustrated), for example to lengthen or shorten the opening time of injectors 17 determined by the primary control module, in order to increase or decrease respectively the richness of a combustion mixture.

Control unit 6 also comprises a detection module 27 that at its input receives control signal $S_C$ created by control module 26, the detection module being capable of detecting, on the basis of control signal $S_C$, the end of a purge phase, as will be described in more detail hereinafter with reference to FIGS. 2 and 3. At its output, detection module 27 delivers a detection signal $S_D$, which is transmitted to control means (not illustrated) of control unit 6, which is capable of causing the purge phase to stop.

Figure 2:
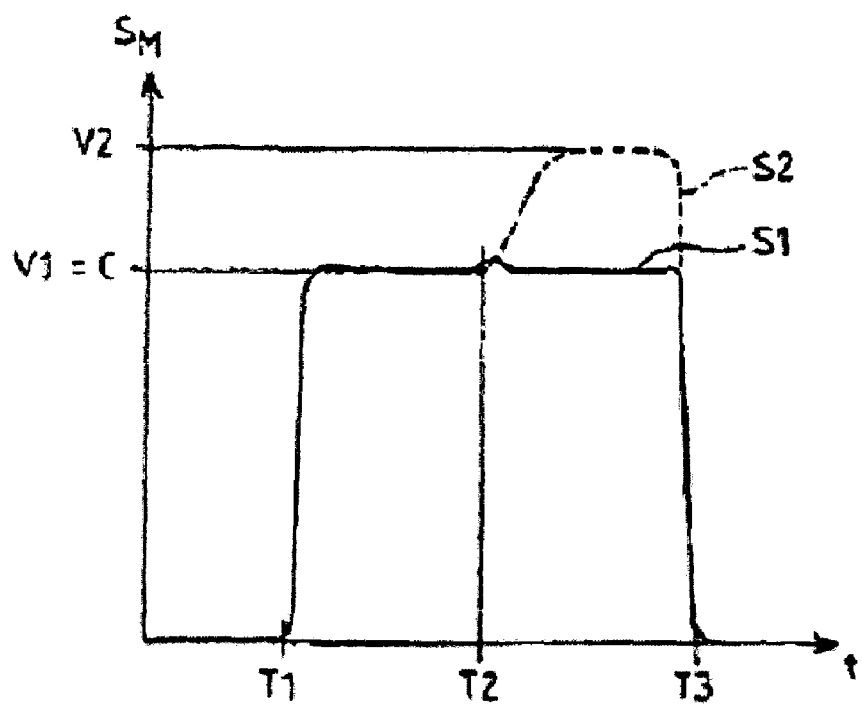
FIG. 2 is a graph illustrating an output signal of an oxygen sensor of the lambda type situated downstream from the purifying means, according to one aspect of the invention.

In FIG. 2, described by retaining the references used for the description of FIGS. 1 and 4, an output signal $S_M$ output signals of sensor 23 during a purge phase are plotted on a graph in which the abscissa is the time and the ordinate is the level of an output signal $S_M$.

A first signal $S_1$ represented by a solid line corresponds to the output signal of lambda sensor 23 obtained in the case of creation of a control signal $S_C$ by regulation on the basis of first signal $S_1$. A second signal $S_2$, coinciding with the first signal $S_1$ except between an intermediate instant T2 and a final instant T3 of a purge phase, is represented by a dotted line. Second signal $S_2$ corresponds to an output signal that would be obtained from a lambda sensor disposed downstream from catalytic converter 14 during a purge phase, but without modification of an exhaust-gas composition upstream from the catalytic converter controlled solely on the basis of the output signal of the said lambda sensor.

Second signal $S_2$ is zero before an initial instant T1 at the start of the purge phase and after a final instant T3 at the end of the purge phase. Immediately after initial instant T1, second signal $S_2$ reaches a first plateau value V1 and remains at this first value V1 substantially until an intermediate instant T2. Immediately after intermediate instant T2, corresponding to the end of reduction of the nitrogen oxides trapped in the nitrogen oxides trap, second signal $S_2$ rises to a second plateau value V2 higher than first value V1. The second value is maintained until final instant T3, from which second signal $S_2$ drops back to the value zero.

First signal $S_1$ reaches first value V1 after the initial instant T1, and substantially maintains this value until final instant T3, from which it drops to the value zero. First signal $S_1$ deviates slightly from first value V1 around the intermediate instant. First value V1 corresponds to setpoint C.

At the start of a purge phase, between initial instant T1 at the start of purging and intermediate instant T2, sensor 23 produces a measured signal $S_M$ representative of the oxygen content of the exhaust gases downstream from catalytic converter 14. It has been seen that this measured signal is proportional to the fuel/air richness of the exhaust gases. As a function of the difference E between measured signal $S_M$, control module 26 determines a control signal $S_C$ applied to injectors 17 and making it possible to vary the fuel/air richness of the combustion mixture and consequently the composition of the exhaust gases. The regulation loop formed by control module 26 has the effect of obtaining a composition of the exhaust gases that maintains measured signal $S_M$ of sensor 23 substantially equal to setpoint C.

Between initial instant T1 and intermediate instant T2, the nitrogen oxides adsorbed on the active sites of catalytic converter 14 are eliminated by oxidation-reduction reactions.

Starting from intermediate instant T2, the nitrogen oxides adsorbed by the catalytic elements of catalytic converter 14 are substantially eliminated. From that point, if the control signal is not changed, the composition of the exhaust gases downstream from catalytic converter 14 is modified, because the reducing agents present in the exhaust gases are no longer being oxidized. In particular, a concentration of hydrogen (H2), which is a nitrogen oxides reducing agent to which the oxygen sensor is sensitive, increases in the exhaust gases. This modification of the composition of the exhaust gases would cause output signal $S_M$ to change from first value V1 to second value V2, as illustrated by second signal $S_2$. Second value V2 is in fact a saturation value of the oxygen sensor.

Because of the regulation, output signal $S_M$ remains substantially constant, as illustrated by signal $S_1$, but the composition of the exhaust gases is modified.

Figure 3:
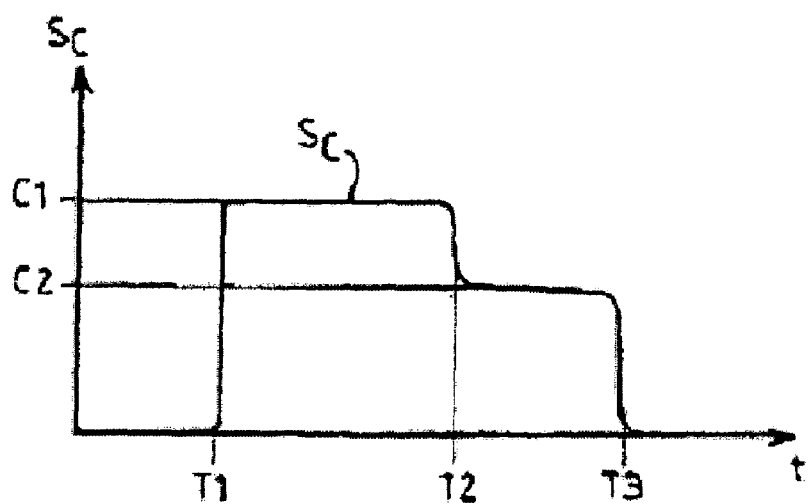
FIG. 3 is a graph illustrating a control signal created on the basis of the output signal according to FIG. 2.

In FIG. 3, described by retaining the references used for FIGS. 1, 2 and 4, a control signal $S_C$ created by control module 26 and corresponding to first measured signal $S_1$ of FIG. 2 is represented schematically on a graph in which time is plotted on the abscissa and the value of control signal $S_C$ is plotted on the ordinate.

Control signal $S_C$, represented by a solid line, is zero before initial instant T1 and after final instant T3. Control signal $S_C$ reaches a first control value C1 after initial instant T1, maintains this value until intermediate instant T2, then reaches a second control value C2, which it maintains substantially until final instant T3.

The jump of control signal $S_C$ after intermediate instant T2 corresponds to the end of reduction of the nitrogen oxides and to the ensuing modification of the composition of the exhaust gases downstream from catalytic converter 14. By virtue of the regulation, control signal $S_C$ is modified in such a way that measured signal $S_1$ remains substantially equal to setpoint value C (FIG. 2) and does not exhibit any jump to second value V2. In contrast, the control signal itself does exhibit a corresponding jump.

The jump of control signal $S_C$ between the first plateau and the second plateau makes it possible to detect the end of purging of the nitrogen oxides and the transition to a final stage of a purge phase. In fact, it will be possible to detect when a threshold of the first derivative of control signal $S_C$ is crossed at instant T2, when the value of the second derivative of control signal $S_C$ becomes zero substantially at instant T2, or even to detect when a threshold of the difference between the value of the instantaneous signal and the sliding mean value of control signal $S_C$ is crossed.

If such a jump is detected, detection module 27 creates a detection signal, indicating that the purge phase must be stopped.

It will be noted that, for reasons of clarity, the time interval between the intermediate time and the final time has been exaggerated relative to the time interval between the initial time and the intermediate time. The time interval between the intermediate time and the final time is short, since purging is stopped as soon as the end of purging is detected.

Furthermore, since an oxygen sensor, especially a lambda sensor, is sensitive to its operating temperature, it will be possible to provide means to keep the temperature of the lambda sensor constant. It will be possible to provide a circuit equipped with a lambda-sensor temperature detector and associated with a lambda-sensor power supply, in order to control a supply voltage of the lambda-sensor heater in such a way as to adjust the temperature of the lambda sensor. Alternatively, it will be possible to compensate for the measurements delivered by the lambda sensor as a function of the temperature of the lambda sensor.

By virtue of the invention, it is possible to control an internal combustion engine in order to implement phases of purging of exhaust-gas purifying means by using an analysis of the composition of the exhaust gases solely downstream from the purifying means. A single sensor can be employed, which reduces the complexity of a control device. In addition, it is possible to use for analysis of the composition an oxygen sensor of the lambda type, more robust and less sensitive to pressure than the oxygen sensors of the proportional type. It will be possible to dispose the purifying means and the associated downstream lambda sensor on the exhaust line close to the outlet of the combustion chambers of the engine. The rapid response time of lambda sensors, especially by comparison with proportional oxygen sensors, will also make it possible to improve the regulation of the composition of the exhaust gases. Moreover, the end of a purge phase can be detected by analysis of a control signal created from the output signal of the sensor.

The invention claimed is:

1. A method for control of an internal combustion engine to regenerate an exhaust-gas purifying mechanism disposed on an exhaust line of the engine, comprising:

analyzing a composition of exhaust gases by an oxygen sensor situated solely downstream from the purifying mechanism during a phase of regeneration of the purifying mechanism; and creating a signal for control of the engine based on the analysis to modify the composition of the exhaust gases upstream from the purifying mechanism so that an output signal from the oxygen sensor reaches a setpoint value immediately after the start of the regeneration phase and substantially maintains the setpoint value through the end of the regeneration phase, wherein the signal for control is zero prior to the start of the regeneration phase, reaches a first control value immediately after the start of the regeneration phase and substantially maintains this value until the end of reduction of nitrogen oxides by the purifying mechanism, then reaches a second control value, which it substantially maintains until the end of the regeneration phase.

2. A method according to claim 1, wherein the oxygen sensor is of all-or-nothing type.

3. A method according to claim 1, wherein an operating temperature of the oxygen sensor is controlled.

4. A method according to claim 1, wherein an output signal of the oxygen sensor is compared with a reference value, and a control signal is created to reduce the difference between the output signal of the oxygen sensor and the reference value.

5. A method according to claim 4, wherein an end stage of the regeneration phase is detected based on the control signal.

6. A control device for regeneration of an exhaust-gas purifying mechanism disposed on an exhaust line of an internal combustion engine, comprising:
 a control module configured to modify fuel injection; and
 an oxygen sensor disposed on the exhaust line directly downstream from the purifying mechanism;
 wherein, during a phase of regeneration of the purifying mechanism, the control module is configured to cause a modification of a composition of exhaust gases solely as a function of an output signal of the oxygen sensor so that an output signal from the oxygen sensor reaches a setpoint value immediately after the start of the regeneration phase and substantially maintains the setpoint value through the end of the regeneration phase, and
 the control module produces a control signal which is zero prior to the start of the regeneration phase, reaches a first control value immediately after the start of the regeneration phase and substantially maintains this value until the end of reduction of nitrogen oxides by the purifying mechanism, then reaches a second control value, which it substantially maintains until the end of the regeneration phase.

7. A device according to claim 6, wherein the oxygen sensor is of all-or-nothing type.

8. A device according to claim 6, further comprising a controller configured to control an operating temperature of the oxygen sensor.

9. A device according to claim 6, further comprising a detection module configured to detect an end of a regeneration phase as a function of a control signal produced by the control module.

10. A device according to claim 6, wherein the purifying mechanism comprises a nitrogen oxides trap.

11. A device according to claim 6, wherein the control module controls an air intake valve.

12. A device according to claim 6, wherein the control module controls an air intake valve and at least one fuel injector.

13. A device according to claim 6, wherein the control module controls at least one fuel injector.

14. A method according to claim 1, wherein the signal controls an air intake valve.

15. A method according to claim 1, wherein the signal controls an air intake valve and at least one fuel injector.

16. A method according to claim 1, wherein the signal controls at least one fuel injector.

* * * * *